…

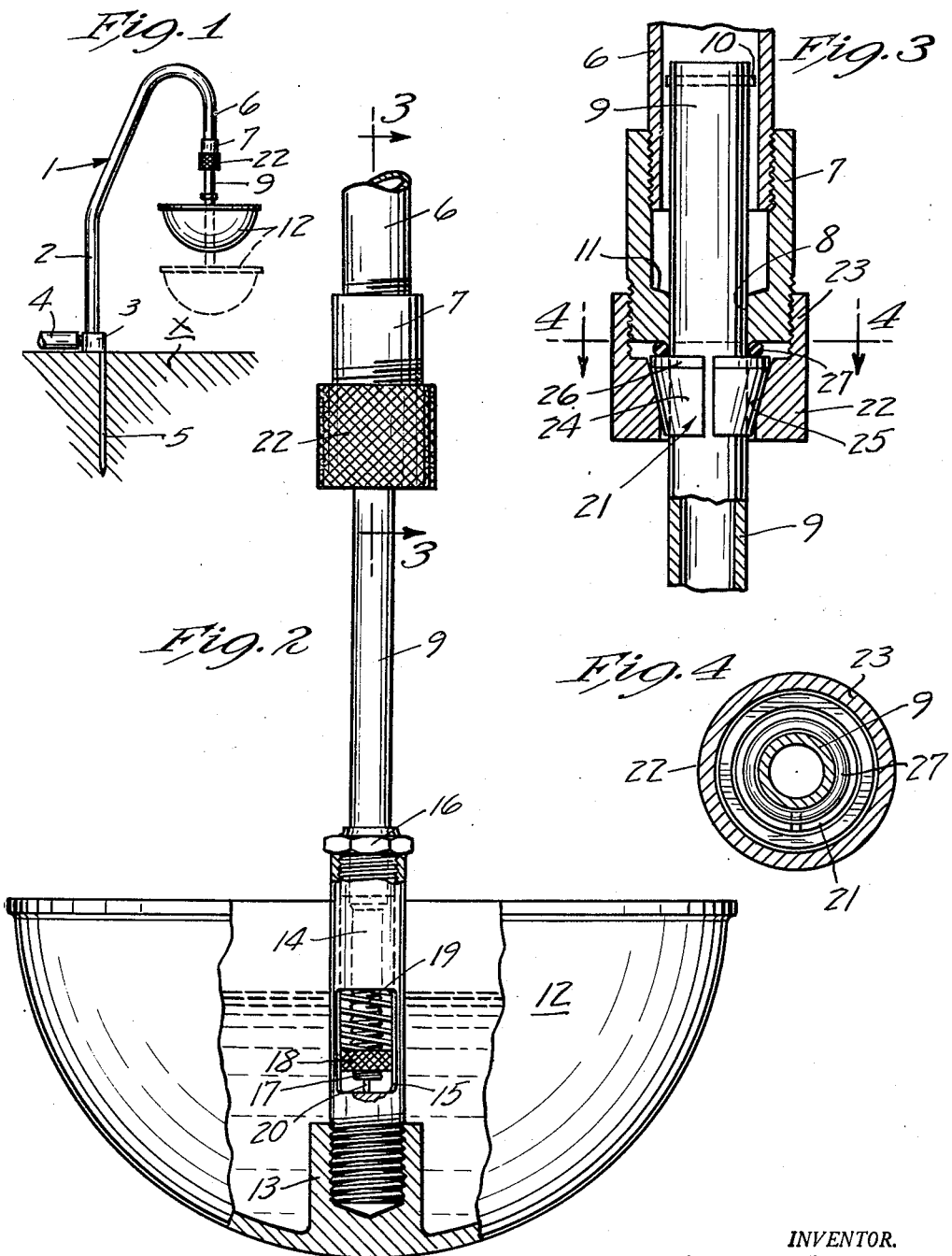
Jan. 25, 1955 — J. W. GOFF — 2,700,370
WATER TUBE EXTENSION FOR POULTRY FOUNTAINS
Filed Aug. 10, 1953
INVENTOR.
John W. Goff
BY
Merchant & Merchant
ATTORNEYS

United States Patent Office 2,700,370
Patented Jan. 25, 1955

2,700,370

WATER TUBE EXTENSION FOR POULTRY FOUNTAINS

John W. Goff, St. Paul, Minn., assignor to United Screw Products & Mfg. Co., St. Paul, Minn., a corporation of Minnesota Application August 10, 1953, Serial No. 373,099

2 Claims. (Cl. 119—74)

My invention relates generally to devices for watering poultry and the like and more particularly to improvements in poultry watering founts whereby the same are adapted for use by small chicks or large-sized birds.

The primary object of my invention is the provision of a support for a poultry watering fount which may be quickly and easily adjusted to locate the fount or drinking bowl close to the ground for the use of small chicks, or at a substantially greater distance from the ground for easy access by full-grown birds. To this end I provide a relatively fixed conduit for delivery of water to the fount and a fount-supporting extension tube telescopically received in said conduit and vertically adjustable with respect thereto.

Another object of my invention is the provision of novel means for releasably locking the above-mentioned extension tube against accidental movement with respect to the conduit.

Another object of my invention is the provision of means for preventing leakage between the delivery end of said conduit and said extension tube.

Still another object of my invention is the provision of stop means positively limiting downward movement of said extension tube with respect to the delivery conduit.

The above and still further highly important objects and advantages of my invention will become apparent from the following detailed specification, appended claims and attached drawings.

Referring to the drawings, which illustrate the invention, and in which like reference characters indicate like parts throughout the several views:

Fig. 1 is a view in side elevation of a drinking fount for poultry made in accordance with my invention;

Fig. 2 is a greatly enlarged view in side elevation corresponding to a portion of Fig. 1, some parts being broken away and some parts shown in section;

Fig. 3 is a still further enlarged fragmentary axial section taken substantially on the line 3—3 of Fig. 2; and Fig. 4 is a transverse section taken on the line 4—4 of Fig. 3.

Referring with greater detail to the drawing, the numeral 1 indicates in its entirety an inverted generally U-shaped tubular delivery conduit one depending leg 2 thereof terminating at its lower end in a receiving head 3 to which a pipe or hose 4 is adapted to be connected. An anchoring spike 5 is welded or otherwise rigidly secured to the head 3, and is driven into the ground to hold the conduit 1 in an upright position. Water is preferably fed through the hose or pipe line 4 from a storage tank or other source of liquid not shown.

The lower end of the other depending leg 6 of the delivery conduit 1 is screw threaded to receive an internally threaded tubular guide element 7. The tubular guide element 7 is provided with a diametrically reduced bore 8 through which slidably projects an extension tube 9 the upper end of which is loosely telescopically received in the delivery end portion or leg 6 of the delivery conduit 1. Stop means positively limiting downward sliding movements of the extension tube 9 with respect to the delivery leg 6 and the guide element 7 comprises a pin or the like 10 extending transversely through the upper end of the extension tube 9 and a cooperating internal annular shoulder 11 in the guide element 7.

A drinking bowl 12 is provided at its central bottom portion with a boss 13 into which is screw threaded the lower end of a tubular sleeve 14. The sleeve 14 is cutaway at one side portion to provide a laterally-opening outlet port 15, and at its upper end is screw threaded to receive a threaded bushing 16 through which the lower end portion of the extension tube 9 slidably extends. The lower diametrically reduced end portion 17 of the extension tube 9 is screw threaded to receive a knurled nut 18 between which and the bushing 16 is interposed a coil compression spring 19. A valve, not shown, is mounted within the lower end portion 17 of the extension tube 9, and includes an axially movable actuator or stem 20. The valve is preferably of the type used in the inner tubes of pneumatic automotive vehicle wheel tires, and together with the bowl 12, sleeve 14 and spring 19 is similar to the structure illustrated in United States Patent 2,501,727. The bowl and valve together with the valve actuating structure in themselves do not comprise the instant invention, hence, for the sake of brevity, further description thereof is not deemed necessary.

Means for locking the extension tube 9 and parts carried thereby in adjusted set position with respect to the ground, indicated at X in Fig. 1, comprises a split clamping ring 21 and a cooperating knurled clamping nut 22, the latter of which is provided with a threaded portion 23 that is screw threaded into the threaded lower end portion of the guide element 7. As shown in Figs. 3 and 4, the clamping ring 21 embraces the extension tube 9 and is provided with a tapering outer surface 24 which is engaged by an inner surface 25 of the clamping nut 22, said inner surface 25 having a taper corresponding to that of the surface 24 of the clamping ring. Interposed between the upper enlarged end 26 of the clamping ring 21 is a rubber-like sealing ring or washer 27 which closely embraces the extension tube 9, and which, when the clamping nut 22 is tightened on the guide element 7, is compressed sufficiently to prevent leakage of water from the delivery conduit 6 through the bore 8 or between the bore 8 and the outer surface of the extension tube 9.

With the above arrangement, when the clamping nut 22 is loosened, clamping pressure between the outer surface of the extension tube 9 and the clamping ring 21 is reduced to the point where the extension tube 9 and the drinking bowl 12 carried thereby may be moved upwardly and downwardly with respect to the supporting conduit 1 as indicated by full and dotted lines in Fig. 6. Obviously, when it is desired to supply water to young poultry, such as small chicks and the like, the drinking bowl 12 and extension tube 9 are moved to a lowered position as indicated by dotted lines in Fig. 1, and in the case of full-grown birds, the bowl 12 is moved upwardly toward the delivery end portion 6 of the conduit 1, the upper end portion of the extension tube 9 moving upwardly within the delivery leg 6. The clamping nut 22 is then tightened upon the guide element 7 to cause clamping pressure to be exerted by the clamping ring 21 on the extension tube 9 and also causing upward movement of the clamping ring 21 against the sealing ring 27 to prevent leakage of water as hereinbefore mentioned. Thus, my improved drinking fount is readily adapted for use with poultry of various sizes and provides a convenient adjustment whereby fowl of all sizes may find easy access to the drinking fount.

While I have shown and described a preferred embodiment of my novel poultry fount, it will be understood that the same is capable of modification without departure from the spirit and scope of the invention as defined in the claims.

What I claim is:

1. A water tube extension for a poultry fount, said fount including a valve-equipped drinking bowl and a tubular water conduit terminating in a downwardly directed threaded discharge end portion for suspending said bowl, said extension comprising an extension tube having means at its lower end for securing the same to said bowl and valve, the upper end of said tube being loosely axially movable within the discharge end of said conduit, a tubular guide element having a threaded upper end portion for engagement with the threaded discharge end of said conduit and an axial bore slidably receiving said extension tube, a split tapered clamping ring embracing said extension tube below said guide element, a sealing ring embracing said extension tube between the guide element and said clamping ring, and a clamping nut encompassing said clamping ring and sealing ring and having screw threaded engagement with said guide element, said clamping nut engaging the tapered outer surface of the split clamping ring to tighten said ring on the extension tube upon axial movement of the nut toward said guide element, said sealing ring being compressed between the adjacent ends of said split clamping ring and guide element to prevent leakage of water from the delivery conduit past the split clamping ring.

2. The structure defined in claim 1 in further combination with stop means positively limiting downward movement of said extension tube with respect to said guide element, said stop means including an annular shoulder in said guide element and a stop pin at the upper end portion of said extension tube engageable with said annular shoulder.

References Cited in the file of this patent

UNITED STATES PATENTS

| | | |
|---|---|---|
| 1,679,276 | Slining | July 31, 1928 |
| 2,410,027 | Guildford | Oct. 29, 1946 |
| 2,461,828 | Lomelino | Feb. 15, 1949 |
| 2,501,727 | Kubista | Mar. 28, 1950 |